United States Patent [19]

Friehler

[11] 4,279,863

[45] Jul. 21, 1981

[54] REAGENT SEPARATOR FOR A BLOOD COLLECTION TUBE

[75] Inventor: William R. Friehler, St. Louis, Mo.

[73] Assignee: Sherwood Medical Industries, Inc., St. Louis, Mo.

[21] Appl. No.: 75,327

[22] Filed: Sep. 12, 1979

[51] Int. Cl.³ .................... C01G 23/00; C01G 9/00; B04B 9/12

[52] U.S. Cl. .................................... 422/102; 422/77; 422/101; 128/272.1; 233/26; 210/516; 210/927

[58] Field of Search ............... 210/516, DIG. 23, 518; 422/99, 101, 102, 72; 233/1 A, 26; 128/272, 272.1, 218 M, 220

[56] References Cited

U.S. PATENT DOCUMENTS

| | | | |
|---|---|---|---|
| 3,481,477 | 12/1969 | Farr | 210/DIG. 23 |
| 3,780,935 | 12/1973 | Lukacs | 233/1 A |
| 3,782,548 | 1/1974 | Bowen | 210/DIG. 23 |
| 3,894,952 | 7/1975 | Ayres | 210/516 |
| 3,901,219 | 8/1975 | Kay | 128/764 |
| 3,920,549 | 11/1975 | Gigliello | 210/DIG. 23 |
| 3,920,557 | 11/1975 | Ayres | 210/516 |
| 3,931,010 | 1/1976 | Ayres et al. | 210/516 |
| 4,147,628 | 4/1979 | Bennett et al. | 210/83 |

*Primary Examiner*—William F. Smith
*Assistant Examiner*—Chris Konkol
*Attorney, Agent, or Firm*—Wegner, Stellman, McCord, Wood & Dalton

[57] ABSTRACT

An apparatus (10,50) is provided for physically retaining a reagent (17) in a blood collection tube (11) separate from a blood sample until the tube (11) is centrifuged. The apparatus includes a cup-shaped flexible barrier (10,50) placed over the reagent (17) disposed in the bottom of the tube (11). The barrier (10,50) seals with the inner wall of the tube (11) and prevents the reagent (17) from entering the tube's upper evacuated chamber (12,55) into which the blood sample is drawn. The seal maintains the barrier (10,50) in position until the tube (11) is centrifuged whereupon the barrier (10,50) moves to the bottom of the tube (11) causing the reagent (17) to flow past the barrier (10,50) to mix with the blood sample.

4 Claims, 6 Drawing Figures

FIG. 1
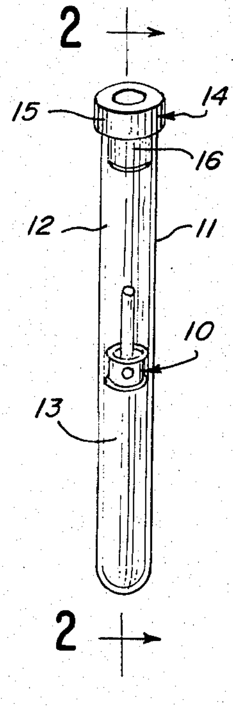
FIG. 2
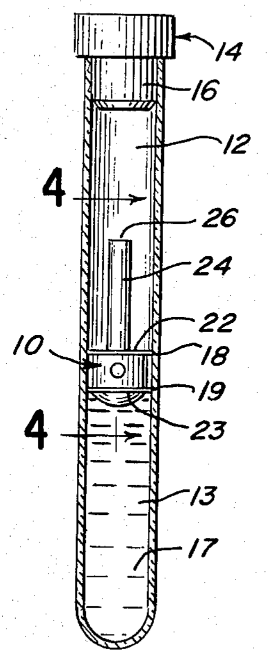
FIG. 3
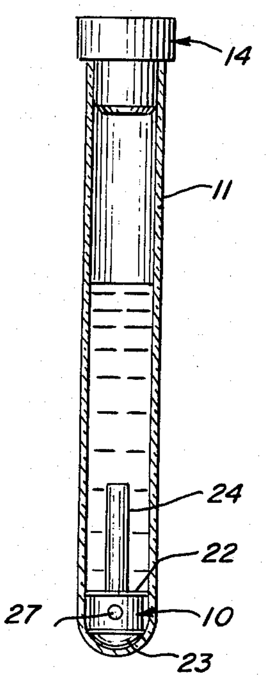
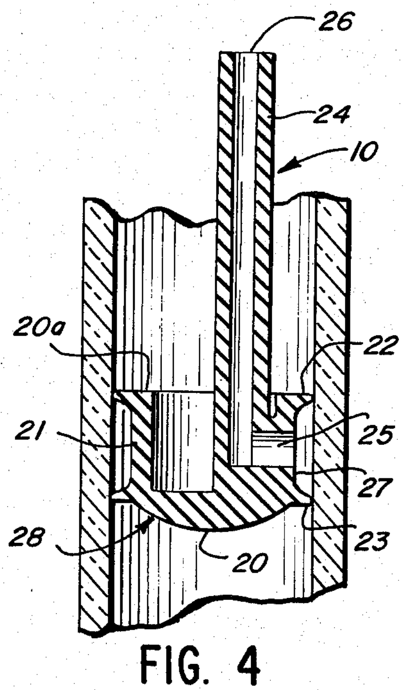
FIG. 4
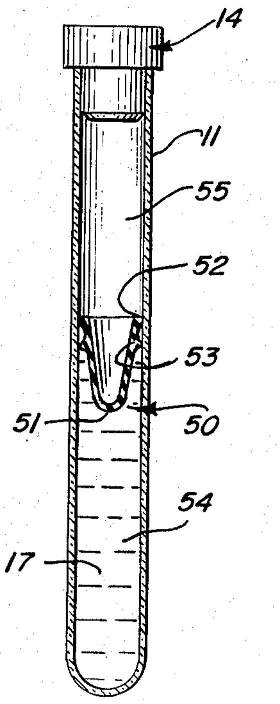
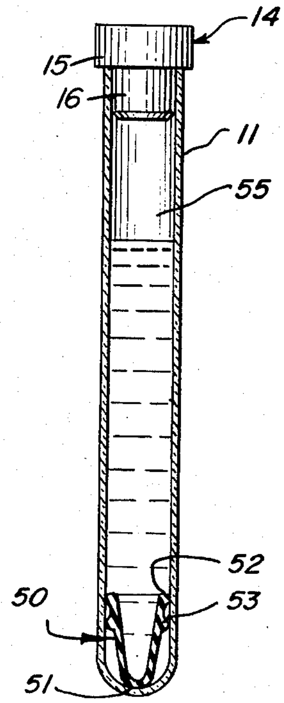
FIG. 5
FIG. 6

REAGENT SEPARATOR FOR A BLOOD COLLECTION TUBE

DESCRIPTION

Technical Field

This invention relates to a diagnostic reagent apparatus and, more particularly, to an apparatus for physically retaining a reagent in a blood collection tube separate from the blood sample until the tube is centrifuged.

BACKGROUND ART

Prior and current diagnostic blood collection tubes having a highly toxic reagent disposed therein prior to taking a blood sample have had several major problems. One of the most serious is that of reagent reflux back through the needle contaminating the patient. Anti-backflow devices have been utilized to remedy the problem of reagent reflux but have been proven inadequate.

Another disadvantage is that the blood sample interacts with the reagent immediately upon being drawn into the sample collection tube. Thus the reaction time of the reagent and blood sample cannot be measured or controlled. Anticoagulants or other sample preservatives cannot be added to the tube with the reagent since they are incompatible. Therefore, it is not possible to preserve the sample in the tube.

DISCLOSURE OF INVENTION

It is, therefore, a principal feature of the present invention to provide a flexible barrier for retaining a reagent physically separate from a blood sample until centrifugation.

The flexible barrier may be a cup-shaped device disposed within a standard sample collection tube directly above the reagent and defining an evacuated upper chamber into which the blood sample is drawn. The device is maintained in place until centrifugation by a ridge formed on its upper peripheral edge. The ridge provides a seal with the inner wall of the collection tube and prevents the reagent from entering the evacuated upper chamber. Upon centrifugation, the seal formed by the ridge is overcome by the centrifugal force applied and the device moves to the bottom of the tube, causing the reagent to flow up past the device to mix with the blood sample.

A second ridge may be formed along the lower peripheral edge of the device establishing a second seal with the inner surface of the collection tube. A nozzle is eccentrically positioned on the wall of the device facing the blood sample and has an inlet located between the upper and lower ridges. When the second seal is overcome during centrifugation, the reagent flows up around the lower ridge, into the inlet and out the nozzle which provides directed flow of the reagent into the upper chamber of the collection tube for proper mixing with the blood sample.

The present invention removes the danger of reagent reflux contaminating the patient by providing a physical barrier separating the reagent from the upper chamber into which the blood sample is drawn. The barrier is placed in a standard size blood collection tube having an evacuated upper chamber so that the patient notices nothing unusual while the sample is taken. After the blood sample is drawn, it remains separated from the reagent until centrifugation, whereupon mixing occurs.

The reaction time of the blood sample and reagent may, therefore, be standardized.

BRIEF DESCRIPTION OF DRAWINGS

FIG. 1 is an isometric view of a blood collection apparatus of the present invention;

FIG. 2 is a cross-sectional side view of the blood collection tube having a flexible barrier disposed therein;

FIG. 3 illustrates the blood collection apparatus after centrifugation;

FIG. 4 is a cross-sectional side view of the flexible barrier;

FIG. 5 is a sectional view of the blood collection tube having a modified form of flexible barrier disposed therein; and FIG. 6 is a sectional view of the blood collection apparatus of FIG. 5 after centrifugation.

BEST MODE FOR CARRYING OUT THE INVENTION

A preferred embodiment of a blood collection tube 11 utilizing the present invention is shown in FIGS. 1–3. A flexible barrier 10 is disposed within the standard size blood collection tube 11 defining an upper chamber 12 and a lower chamber 13. A stopper 14 having a flanged end 15 and a cylindrical bottom portion 16 forms a continuous seal with the inner surface of the collection tube 11.

A reagent 17 is disposed within the lower chamber 13 over which the flexible barrier 10 is placed, sealing with the inner surface of the collection tube 11 along its upper and lower edges 18 and 19. After the barrier 10 is in place, anticoagulants or other sample preservatives may be added to the upper chamber 12 if desired. The upper chamber 12 is then evacuated a predetermined amount so that the apparatus will draw the precise amount of sample required to react with the reagent 17 for testing.

Shown more clearly in FIG. 4, the flexible barrier 10 is comprised of a cup-shaped body 28 having a spherical bottom wall 20, a disc-shaped top wall 20*a*, and a cylindrical side wall 21 between the bottom wall and top wall. A ridge 22 is formed around the upper peripheral edge of the cylindrical side wall 21 and a second ridge 23 is formed around its bottom edge. When barrier 10 is placed within the collection tube 11, ridges 22 and 23 form seals with the inner surface of the tube 11 and restrains the device against movement prior to centrifugation. A nozzle 24, extending into the upper chamber 12 of the collection tube 11, is eccentrically positioned on the top wall 20*a* of the device. A conduit 25 extends through the body 28 of the barrier 10 and connects the nozzle 24 on the top wall 20*a* with an inlet 27 into a space around the outer portion of the side wall 21 between ridges 22 and 23.

The flexible barrier 10 remains in position in the tube 11 to isolate the reagent 17 during storage, shipment and normal handling. The barrier 10 prevents the reagent 17 from entering the evacuated upper chamber 12 before or during the drawing of the blood sample so that reagent reflux back into the patient's bloodstream cannot occur. After the blood sample is drawn into chamber 12, it remains physically separate from the reagent 17 due to the flexible barrier 10. When the blood collection tube 11 is centrifuged, the frictional force holding barrier 10 in place is overcome and the barrier 10 moves rapidly to the bottom of the tube 11, as shown in FIG.

3. As barrier 10 moves toward the bottom of the tube 11, the reagent 17 flows around ridge 23 into conduit 25 to nozzle 24. The reagent 17 is then sprayed from nozzle 24 causing mixing with the blood sample in the upper chamber 12.

For a reagent having a greater density than the blood sample, the nozzle 24 extends far enough into the upper chamber 12 so that its outlet 26 is positioned above the blood sample. Upon centrifugation, the reagent 17 is then sprayed from nozzle 24 onto the top of the sample to ensure proper mixing. For reagents having a similar or lower density than the sample, the nozzle 24 may be positioned such that the reagent 17 will be sprayed from the nozzle into or under the sample layer for effective mixing.

FIGS. 5 and 6 show a modified version of the invention wherein the flexible barrier 50 has a cup-shaped body 51 formed of a material having some reasonable degree of stiffness sufficient to retain its shape under normal handling. The barrier 50 has a ridge 52 formed around the outer periphery thereof along an upper edge 53 of the cup-shaped body 51. The body 51 and ridge 52 are stiff enough, when in place in a sample collection tube 11, to retain the reagent 17 in a lower chamber 54 separate from the evacuated upper chamber 55. When a blood sample is drawn into the upper chamber 55, the reagent cannot by reflux be drawn back into the patient. The barrier 50 will remain in place separating the reagent 17 and the blood sample until the tube 11 is centrifuged whereupon the reagent 17 will deflect the lip of the cup-shaped body 51 diametrically inward as the ridge 52 also deflects to permit the reagent to pass as the centrifugal force moves the barrier 50 toward the bottom of the tube 11. The reagent and blood will mix as described above.

INDUSTRIAL APPLICABILITY

The flexible barrier 10,50 of the present invention maintains the reagent 17 and sample separate so that the onset of the reaction may be controlled. Utilizing this device also allows standardization of the reaction time since the reaction begins and is completed during centrifugation.

Further, the patient notices nothing unusual while a blood sample is being drawn since the blood flows into an empty evacuated chamber as in standard collection tubes. The size of the tube and flexible barrier may vary depending on the volume of the sample and reagent required.

The major advantage of the blood collection apparatus of the present invention is that it allows one-step diagnostic testing of the sample without any risk of reagent reflux contaminating the patient. Such diagnostic tests include those detecting sickle cell anemia, salicylate, and various other diseases. The apparatus is also useful in sample preparatory steps such as deproteinization.

Other aspects, objects and advantages of the invention can be obtained from a study of the drawings, the disclosure and the appended claims.

I claim:

1. An apparatus (10) for retaining a reagent material (17) disposed within a sample collection tube (11) physically separate from a sample until centrifugation, comprising:

a flexible barrier (10) positioned within said sample collection tube (11) between the reagent material (17) and an evacuated upper chamber (12) into which the sample is drawn, said flexible barrier (10) having a spherical bottom wall (20) and a cylindrical side wall (21), said barrier (10) having a first ridge (22) formed around the upper peripheral edge of said side wall (21), said first ridge (22) forming a first seal with the inner surface of the sample collection tube (11), said first seal remaining intact until centrifugation of the sample collection tube (11), a second ridge (23) formed around the lower peripheral edge of said side wall (21), said second ridge (23) forming a second seal with the inner surface of the sample collection tube (11), said second seal (23) remaining intact until centrifugation of the sample collection tube (11), said spherical bottom wall (20) of the flexible barrier (10) mates with the bottom of the sample collection tube (11) to discharge substantially all of the reagent material past the barrier upon centrifugation of the collection tube.

2. The apparatus of claim 1 wherein said flexible barrier (10) has a nozzle (24) positioned on a top wall (20*a*) of said barrier (10), said nozzle (24) is in fluid communication with an inlet (27) in said cylindrical side wall (21) between said first ridge (22) and said second ridge (23).

3. The apparatus of claim 1 wherein said flexible barrier (10) has a nozzle (24) eccentrically positioned on a disc-shaped top wall (20*a*) of the barrier (10), said nozzle (24) is connected through a conduit (25) to an inlet (27) positioned between the first-named ridge (22) and said second-named ridge (23).

4. The apparatus of claim 3 wherein the nozzle (24) extends into the upper chamber (12) of the sample collection tube (11), the distance said nozzle (24) extends being dependent upon the relative densities of the sample to be drawn and the reagent material (17) disposed within said collection tube (11).

* * * * *

UNITED STATES PATENT AND TRADEMARK OFFICE

CERTIFICATE OF CORRECTION

PATENT NO. : 4,279,863

DATED : JULY 21, 1981

INVENTOR(S) : WILLIAM R. FIEHLER

It is certified that error appears in the above-identified patent and that said Letters Patent are hereby corrected as shown below:

Change the inventor's name in both places on the title page from "Friehler" to -- Fiehler --.

Signed and Sealed this

*Seventeenth* Day of *November 1981*

[SEAL]

*Attest:*

GERALD J. MOSSINGHOFF

*Attesting Officer* *Commissioner of Patents and Trademarks*